(12) United States Patent
Dinan et al.

(10) Patent No.: US 10,073,809 B2
(45) Date of Patent: Sep. 11, 2018

(54) TECHNOLOGIES FOR SCALABLE REMOTELY ACCESSIBLE MEMORY SEGMENTS

(71) Applicant: Intel Corporation, Santa Clara, CA (US)

(72) Inventors: James Dinan, Hudson, MA (US); Mario Flajslik, Hudson, MA (US)

(73) Assignee: Intel Corporation, Santa Clara, CA (US)

( * ) Notice: Subject to any disclaimer, the term of this patent is extended or adjusted under 35 U.S.C. 154(b) by 546 days.

(21) Appl. No.: 14/696,719

(22) Filed: Apr. 27, 2015

(65) Prior Publication Data

US 2016/0314073 A1     Oct. 27, 2016

(51) Int. Cl.
G06F 3/06         (2006.01)
G06F 15/173     (2006.01)

(52) U.S. Cl.
CPC ........ *G06F 15/17331* (2013.01); *G06F 3/061* (2013.01); *G06F 3/067* (2013.01); *G06F 3/0659* (2013.01)

(58) Field of Classification Search
CPC .............................................. G06F 15/17331
See application file for complete search history.

(56) References Cited

U.S. PATENT DOCUMENTS

| | | | |
|---|---|---|---|
| 2002/0144006 A1 | 10/2002 | Cranston | |
| 2003/0088712 A1 | 5/2003 | Schultz | |
| 2009/0198918 A1* | 8/2009 | Arimilli | G06F 9/544 711/153 |
| 2012/0173841 A1* | 7/2012 | Meier | G06F 12/1009 711/202 |

FOREIGN PATENT DOCUMENTS

EP     1396790     3/2004

OTHER PUBLICATIONS

International Search Report for PCT/US16/020024, dated Jul. 26, 2016 (3 pages).
Written Opinion for PCT/US16/020024, dated Jul. 26, 2016 (8 pages).
Latchesar Ionkov & Ginger Young, "Asymmetric Memory Extension for Open SHMEM," in Proceedings of the 8th International Conference on Partitioned Global Address Space Programming Models (PGAS '14), (ACM, New York, NY, USA 2014).

* cited by examiner

*Primary Examiner* — Edward J Dudek, Jr.
(74) *Attorney, Agent, or Firm* — Barnes & Thornburg LLP

(57) ABSTRACT

Technologies for one-side remote memory access communication include multiple computing nodes in communication over a network. A receiver computing node receives a message from a sender node and extracts a segment identifier from the message. The receiver computing node determines, based on the segment identifier, a segment start address associated with a partitioned global address space (PGAS) segment of its local memory. The receiver computing node may index a segment table stored in the local memory or in a host fabric interface. The receiver computing node determines a local destination address within the PGAS segment based on the segment start address and an offset included in the message. The receiver computing node performs a remote memory access operation at the local destination address. The receiver computing node may perform those operations in hardware by the host fabric interface of the receiver computing node. Other embodiments are described and claimed.

17 Claims, 5 Drawing Sheets

TECHNOLOGIES FOR SCALABLE REMOTELY ACCESSIBLE MEMORY SEGMENTS

This invention was made with Government support under contract number H98230-13-D-0124 awarded by the Department of Defense. The Government has certain rights in this invention.

BACKGROUND

Many current parallel computing applications use a partitioned global address space (PGAS) programming model, often in combination with one-sided communication. A PGAS application defines a global address space that is separated into one or more logical partitions. Each logical partition may be owned by, assigned to, or otherwise have an affinity to a particular process, and each process of a multi-process application typically executes on a separate computing node. Thus, PGAS applications may allow developers to create parallel programs that take advantage of locality of reference for better performance. One-sided communication memory access models allow a sender process to transmit a memory access message (e.g., a get, put, or other message) to a receiver process without the involvement of the receiver process. One-sided communication may support hardware acceleration, which is particularly important for high-performance computing (HPC) applications.

Certain current approaches for providing multiple remotely accessible memory segments and/or memory allocations require each sender process to store or retrieve communication parameters associated with each receiver process. For example, Latchesar Ionkov & Ginger Young, *Asymmetric Memory Extension for OpenSHMEM*, Procs. of the 8th Int'l Conf. on Partitioned Global Address Space Programming Models (PGAS '14) (2014), proposes an asymmetric allocation extension to OpenSHMEM that requires each sender to first fetch and cache communication parameters from the receiver process prior to transmitting memory access messages. Thus, current approaches may cause the memory stored at each sender process to increase linearly with the total number of processes in the system.

Other current solutions may layer multiple memory segments and/or allocations on a single-segment PGAS with symmetric addresses. In those systems, each process must reserve an address space large enough for the largest buffer that any process exposes in the segment. Additionally, many commodity operating systems such as Linux® do not provide support for symmetric addresses across multiple nodes in an HPC cluster.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
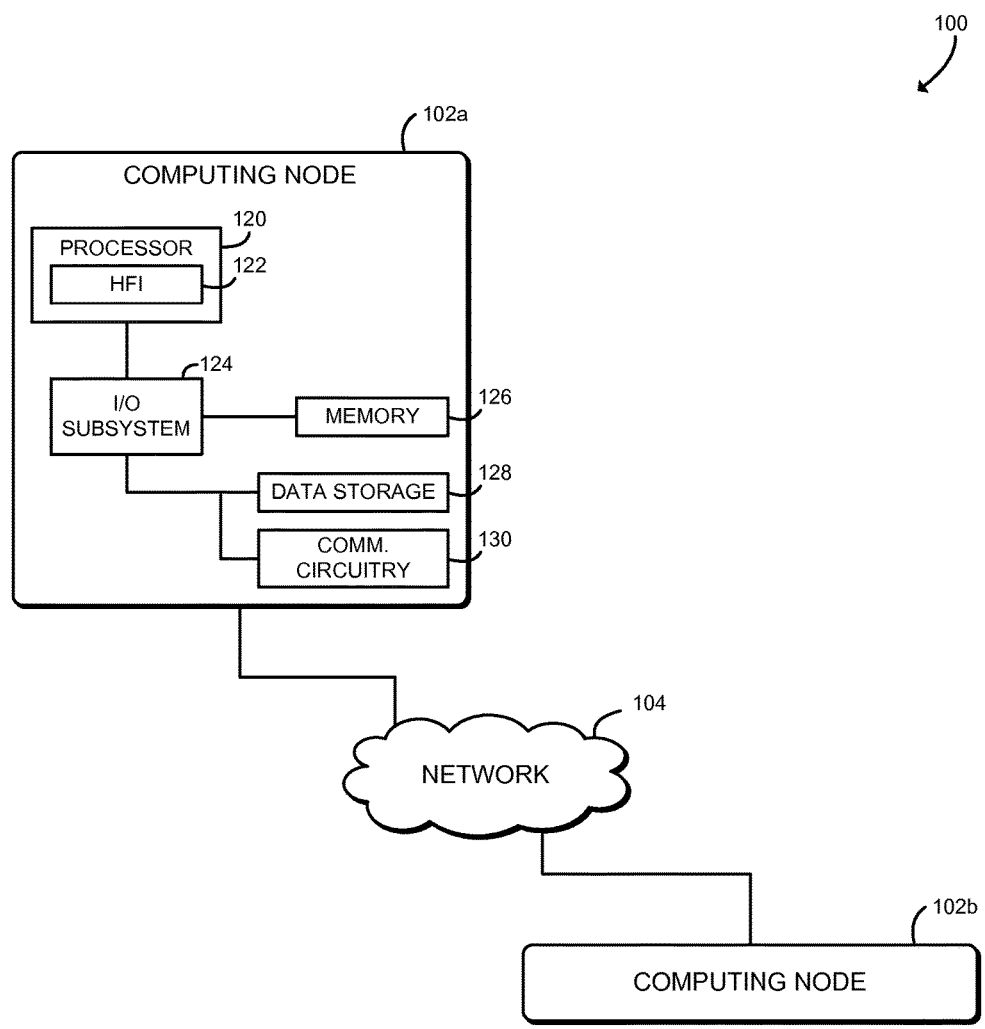
FIG. 1 is a simplified block diagram of at least one embodiment of a system for accessing remotely accessible memory segments.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in an illustrative embodiment, a system 100 for scalable remote memory access includes several computing nodes 102 in communication over a network 104. The illustrated system 100 includes two computing nodes 102*a*, 102*b*; however, it should be understood that the system 100 may include many more computing nodes 102. In use, as described in more detail below, a process of the sender computing node 102*a* transmits a one-sided memory access message (e.g., a get message or a put message) to the receiver computing node 102*b*. The receiver computing node 102*b* extracts a partitioned global address space (PGAS) segment identifier from the message and looks up a segment start address using information stored locally by the receiver computing node 102*b*. Using the segment start address and an offset included in the message, the receiver computing node 102*b* performs the requested memory operation. The receiver computing node 102*b* may perform those operations in software or in hardware, for example by a host fabric interface, network interface controller, or other networking hardware of the receiver computing node 102*b*. Thus, the system 100 does not require the sender node 102*a* to store communication parameters (e.g., segment start addresses) for every receiver node 102*b* in the system 100, which may improve scalability for large numbers of computing nodes 102. In particular, the memory requirements for each computing node 102 may scale linearly with the number of PGAS segments in the system 100, without regard to the number of computing nodes 102 and/or other computing processes in the system 100. Additionally, the system 100 may support hardware acceleration of one-sided memory operations and is thus suitable for high-performance computing (HPC) and other performance-sensitive applications. Further, the system 100 does not require support for symmetric memory addresses and thus may be implemented with commodity operating systems such as Linux®.

Each computing node 102 may be embodied as any type of computation or computer device capable of performing the functions described herein, including, without limitation, a computer, a server, a rack-mounted server, a high-performance computing node; a desktop computer, a workstation, a laptop computer, a notebook computer, a tablet computer, a mobile computing device, a wearable computing device, a network appliance, a distributed computing system, a processor-based system, and/or a consumer electronic device. As shown in FIG. 1, the computing node 102 illustratively includes a processor 120, an input/output subsystem 124, a memory 126, a data storage device 128, and communication circuitry 130. Of course, the computing node 102 may include other or additional components, such as those commonly found in a server computer (e.g., various input/output devices), in other embodiments. Additionally, in some embodiments, one or more of the illustrative components may be incorporated in, or otherwise form a portion of, another component. For example, the memory 126, or portions thereof, may be incorporated in the processor 120 in some embodiments.

The processor 120 may be embodied as any type of processor capable of performing the functions described herein. The processor 120 may be embodied as a single or multi-core processor(s), digital signal processor, microcontroller, or other processor or processing/controlling circuit. The illustrative processor 120 includes a host fabric interface 122. The host fabric interface 122 may be embodied as any communication interface, such as a network interface controller, communication circuit, device, or collection thereof, capable of enabling communications between the processor 120 and other remote computing nodes 102 and/or other remote devices over the network 104. The host fabric interface 122 may be configured to use any one or more communication technology and associated protocols (e.g., Ethernet, InfiniBand®, Intel® Omni-Path Architecture, etc.) to effect such communication. Although illustrated as including a single processor 120, it should be understood that each computing node 102 may include multiple processors 120, and each processor 120 may include an integrated host fabric interface 122.

The memory 126 may be embodied as any type of volatile or non-volatile memory or data storage capable of performing the functions described herein. In some embodiments, the memory 126 may include two or more different types of memory having different performance or storage characteristics, such as dynamic RAM, nonvolatile RAM, on-package memory, etc. In operation, the memory 126 may store various data and software used during operation of the computing node 102 such as operating systems, applications, programs, libraries, and drivers. The memory 126 is communicatively coupled to the processor 120 via the I/O subsystem 124, which may be embodied as circuitry and/or components to facilitate input/output operations with the processor 120, the memory 126, and other components of the computing node 102. For example, the I/O subsystem 124 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 124 may form a portion of a system-on-a-chip (SoC) and be incorporated, along with the processor 120, the memory 126, and other components of the computing node 102, on a single integrated circuit chip.

The data storage device 128 may be embodied as any type of device or devices configured for short-term or long-term storage of data such as, for example, memory devices and circuits, memory cards, hard disk drives, solid-state drives, or other data storage devices. The communication circuitry 130 of the computing node 102 may be embodied as any communication circuit, device, or collection thereof, capable of enabling communications between the computing node 102 and one or more remote computing nodes 102 and/or other remote devices over the network 104. The communication circuitry 130 may be configured to use any one or more communication technology (e.g., wired or wireless communications) and associated protocols (e.g., Ethernet, InfiniBand®, Intel® Omni-Path Architecture, Bluetooth®, Wi-Fi®, WiMAX, etc.) to effect such communication.

As discussed in more detail below, the computing nodes 102 may be configured to transmit and receive data with each other and/or other devices of the system 100 over the network 104. The network 104 may be embodied as any number of various wired and/or wireless networks. For example, the network 104 may be embodied as, or otherwise include, a wired or wireless local area network (LAN), a wired or wireless wide area network (WAN), a cellular network, and/or a publicly-accessible, global network such as the Internet. As such, the network 104 may include any number of additional devices, such as additional computers, routers, and switches, to facilitate communications among the devices of the system 100.

Figure 2:
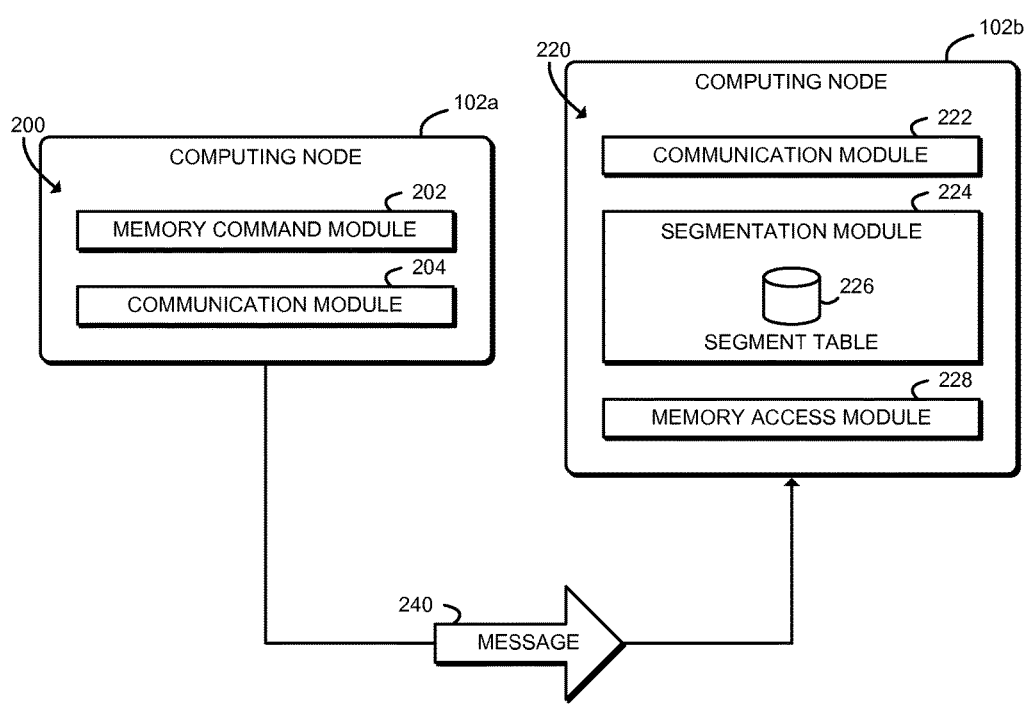
FIG. 2 is a simplified block diagram of at least one embodiment of various environments that may be established by the system of FIG. 1.

Referring now to FIG. 2, in an illustrative embodiment, a computing node 102*a* establishes an environment 200 during operation, and a computing node 102*b* establishes an environment 220 during operation. In the illustrative embodiment, the computing node 102*a* executes the sender process that transmits a message 240 to the computing node 102*b*, which executes the receiver process. Of course, the roles of the computing nodes 102a, 102b and their respective environments 200, 220 may be reversed for transmitting a message 240 in the other direction (i.e., the computing node 102a may establish the environment 220 to receive a message 240).

The illustrative environment 200 includes a memory command module 202 and a communication module 204. The various modules of the environment 200 may be embodied as hardware, firmware, software, or a combination thereof. For example the various modules, logic, and other components of the environment 200 may form a portion of, or otherwise be established by, the processor 120, the host fabric interface 122, or other hardware components of the computing node 102a. As such, in some embodiments, any one or more of the modules of the environment 200 may be embodied as a circuit or collection of electrical devices (e.g., a memory command circuit or a communication circuit).

The memory command module 202 is configured to create a remote memory access message 240 that includes a segment identifier and an offset. The segment identifier identifies a remotely accessible segment of the memory 126 of the receiver computing node 102b. The message 240 may be embodied as a get message, a put message, an atomic update message, or any other type of one-sided remote memory access message. In some embodiments, the remote memory access message 240 may further include a message length, message data, a network address or rank to identify the receiver computing node 102b, and/or other information. The communication module 204 is configured to transmit the remote memory access message 240 to the receiver computing node 102b.

Still referring to FIG. 2, in the illustrative embodiment, the computing node 102b establishes the environment 220 during operation. The illustrative environment 220 includes a communication module 222, a segmentation module 224, and a memory access module 228. The various modules of the environment 220 may be embodied as hardware, firmware, software, or a combination thereof. For example the various modules, logic, and other components of the environment 220 may form a portion of, or otherwise be established by, the processor 120, the host fabric interface 122, or other hardware components of the computing node 102b. As such, in some embodiments, any one or more of the modules of the environment 220 may be embodied as a circuit or collection of electrical devices (e.g., a communication circuit, a segmentation circuit, etc.).

The communication module 222 is configured to receive the remote memory access message 240 from the sender computing node 102a. As described above, the remote memory access message 240 includes a segment identifier and an offset. In some embodiments, the remote memory access message 240 may further include a message length, message data, a network address or rank to identify the receiver computing node 102b, and/or other information.

The segmentation module 224 is configured to determine a segment start address based on the segment identifier. The segment start address is associated with remotely accessible partitioned global address space (PGAS) segment of the memory 126 of the computing node 102b. The segmentation module 224 is further configured to determine a local destination address within the remotely accessible PGAS segment as a function of the segment start address and the offset. In some embodiments, the segmentation module 224 may be configured to determine the segment start address by indexing a segment table 226 with the segment identifier to retrieve the segment start address. The segment table 226 may be stored in the memory 126 of the computing node 102b or in some embodiments may be stored in the host fabric interface 122 of the computing node 102b. In some embodiments, the segmentation module 224 may be further configured to detect an overflow condition based on the offset, the message length, and the segment size of the PGAS segment.

The memory access module 228 is configured to perform a remote memory access operation requested by the remote memory access message 240 at the local destination address determined by the segmentation module 224. The memory access module 228 may be configured to read data from the local destination address, to write data to the local destination address, and/or to perform any other requested memory operation (e.g., an atomic update operation).

Figure 3:
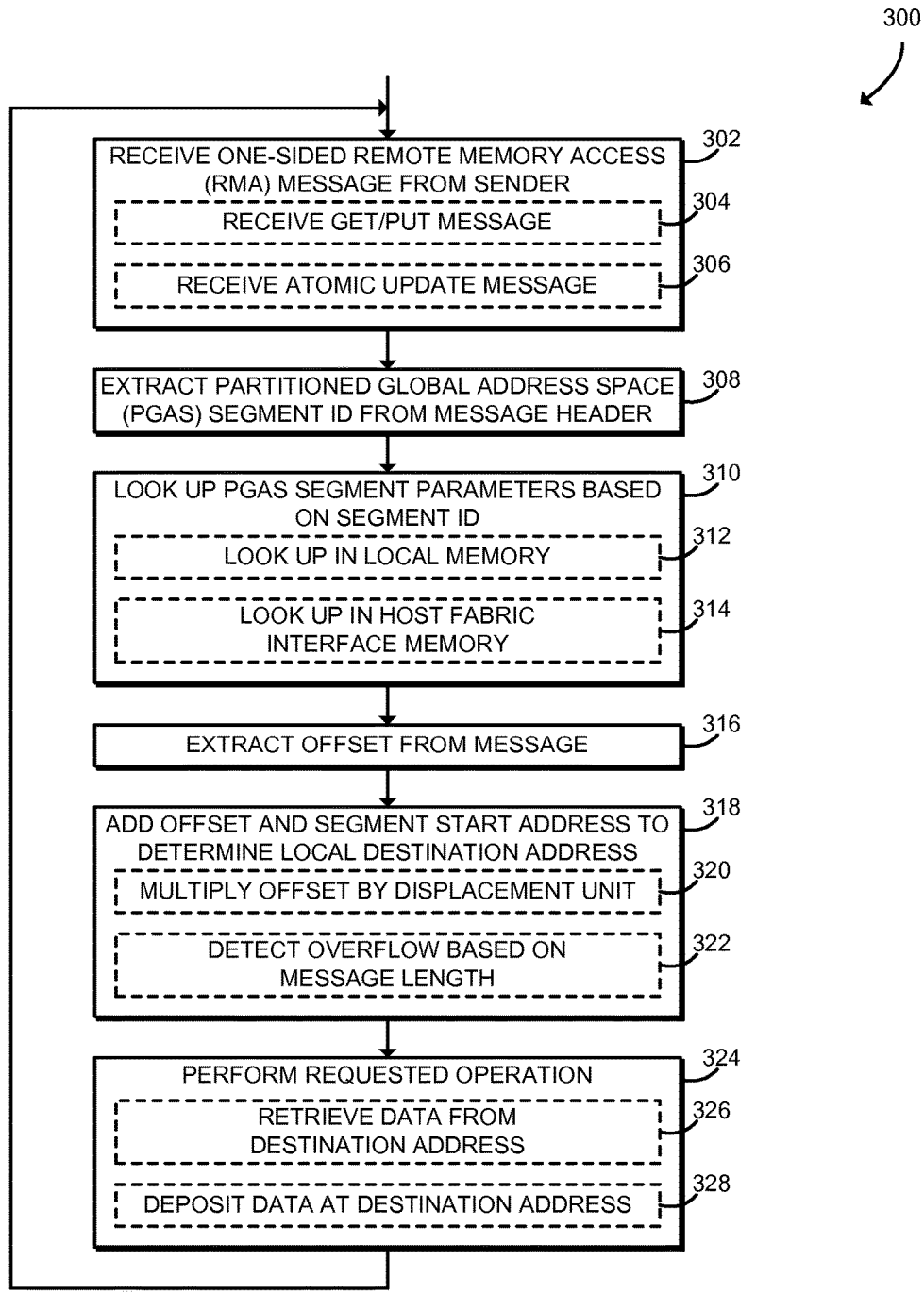
FIG. 3 is a simplified flow diagram of at least one embodiment of a method for remote access to a remotely accessible memory segment that may be executed by a receiver computing node of the system of FIGS. 1 and 2.

Referring now to FIG. 3, in use, a computing node 102b may execute a method 300 for processing a remote memory access message 240 received from a computing node 102a. The method 300 may be executed in hardware, in software, or in any combination of hardware and software. For example, the method 300 may be executed by the processor 120 in software, or may be executed by the host fabric interface 122 and/or the communication circuitry 130 in hardware. The method 300 begins with block 302, in which the computing node 102b receives a one-sided remote memory access message 240 from the computing node 102a. As described further below, the message 240 includes a header that may include information that identifies a particular memory location in a remotely accessible partitioned global address space (PGAS) memory segment of the memory 126. That information may include, for example, a segment identifier, an offset, and other information. The message 240 also identifies one or more memory operations requested by the computing node 102a to be performed by the computing node 102b.

In some embodiments, in block 304 the computing node 102b may receive a get or put message 240. The get or put message 240 instructs the computing node 102b to read or write data, respectively, at a particular destination address in the PGAS segment. In some embodiments, in block 306, the computing node 102b may receive an atomic update message 240. The computing node 102b may also receive higher-level messages, such as collective messages, synchronization messages, or other messages.

In block 308, the computing node 102b extracts the PGAS segment identifier from the header of the message 240. The PGAS segment identifier may be embodied as any number or other data that may identify a particular PGAS segment established by the computing node 102b. Each PGAS segment may include a contiguous or non-contiguous region of memory 126 that may be accessed remotely. For example, the PGAS segment may include an array section exposed for remote access. Additionally, each PGAS segment may correspond to a different type of memory 126. For example, one PGAS segment may correspond to ordinary DRAM, and another PGAS segment may correspond to non-volatile RAM or on-package memory. The same PGAS segment identifier (e.g., the same integer) may be used by many computing nodes 102 to access the same remotely accessible PGAS segment.

In block 310, the computing node 102b looks up PGAS segment parameters based on the segment identifier. The computing node 102b may, for example, index the segment table 226 to retrieve the PGAS segment parameters. The PGAS segment parameters may include any information needed to access a particular PGAS segment established by the computing node 102b, such as a segment start address (also called a segment base address), segment size, segment displacement unit, and other parameters. As described above, the computing node 102*b* may look up the PGAS segment parameters in software (e.g., by the processor 120) or in hardware (e.g., by the host fabric interface 122). In some embodiments, in block 312, the computing node 102*b* may look up the PGAS segment parameters in the local memory 126 of the computing node 102*b*. In some embodiments, in block 314, the computing node 102*b* may look up the PGAS segment parameters in memory or other storage of the host fabric interface 122. For example, the PGAS segment parameters may be cached or otherwise copied to dedicated memory of the host fabric interface 122.

In block 316, the computing node 102*b* extracts the offset from the message 240. The offset describes a particular memory location within the PGAS segment, for example by identifying a starting address of a particular buffer in the PGAS segment. In block 318, the computing node 102*b* adds the offset and the segment start address to determine a local destination address for the message 240. Additionally, the computing node 102*b* may perform any other address translations, page table lookups, or other address manipulations required to address a particular memory location within the memory 126. As described above, the computing node 102*b* may extract the offset and calculate the local destination address in software (e.g., by the processor 120) or in hardware (e.g., by the host fabric interface 122).

In some embodiments, in block 320, the computing node 102*b* may multiply the offset by a segment displacement unit before adding the product to the segment start address. The segment displacement unit may be included in the PGAS segment parameters or determined from a data type associated with the PGAS segment, and may be used to calculate relative displacements. In some embodiments, in block 322, the computing node 102*b* may detect any overflow of the PGAS segment based on the length of the message 240. For example, the computing node 102*b* may detect overflow by comparing the offset and the message length to the segment size.

In block 324, the computing node 102*b* performs the memory operation requested by the message 240. As described above, the memory operation may be performed in software (e.g., by the processor 120) or in hardware (e.g., by the host fabric interface 122). In some embodiments, in block 326 the computing node 102*b* may retrieve data from the local destination address in the memory 126. In some embodiments, in block 328 the computing node 102*b* may deposit data at the local destination address in the memory 126. After performing the requested operation, the method 300 loops back to block 302 to continue processing one-sided remote memory access messages 240.

Figure 4:
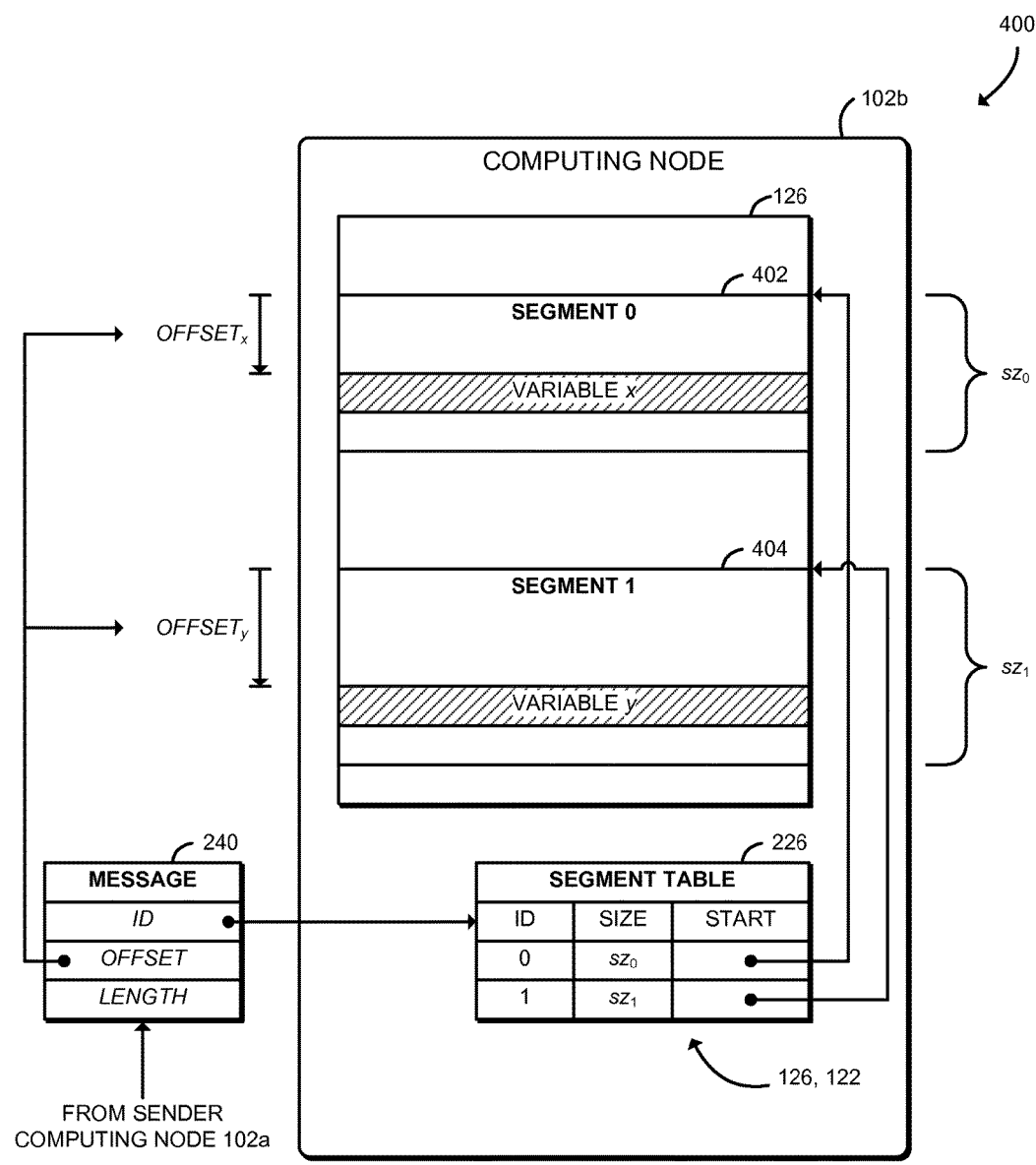
FIG. 4 is a schematic diagram illustrating a local destination address determination that may be performed as a part of the method of FIG. 3.

Referring now to FIG. 4, diagram 400 illustrates one potential embodiment of a technique for accessing PGAS segments. The illustrative computing node 102*b* establishes two PGAS segments 402, 404 within the memory 126. Each of the segments 402, 404 has an integer segment ID, illustratively 0 and 1. As shown, the computing node 102*b* receives a message 240 from the computing node 102*a*. The message 240 includes a segment ID, an offset, and a length. As shown, the segment ID may be used to index the segment table 226 to retrieve the segment start address and the segment size associated with the selected segment 402, 404. The segment table 226 may be stored in the memory 126 or in the host fabric interface 122. Thus, to access the variable x, the message 240 may include the segment ID 0 to select the segment 402, and the offset value $OFFSET_x$. Similarly, to access the variable y, the message 240 may include the segment ID 1 to select the segment 404, and the offset value $OFFSET_y$. The computing node 102*b* may detect overflow by comparing the specified offset and length with the appropriate segment size $sz_0$, $sz_1$.

Figure 5:
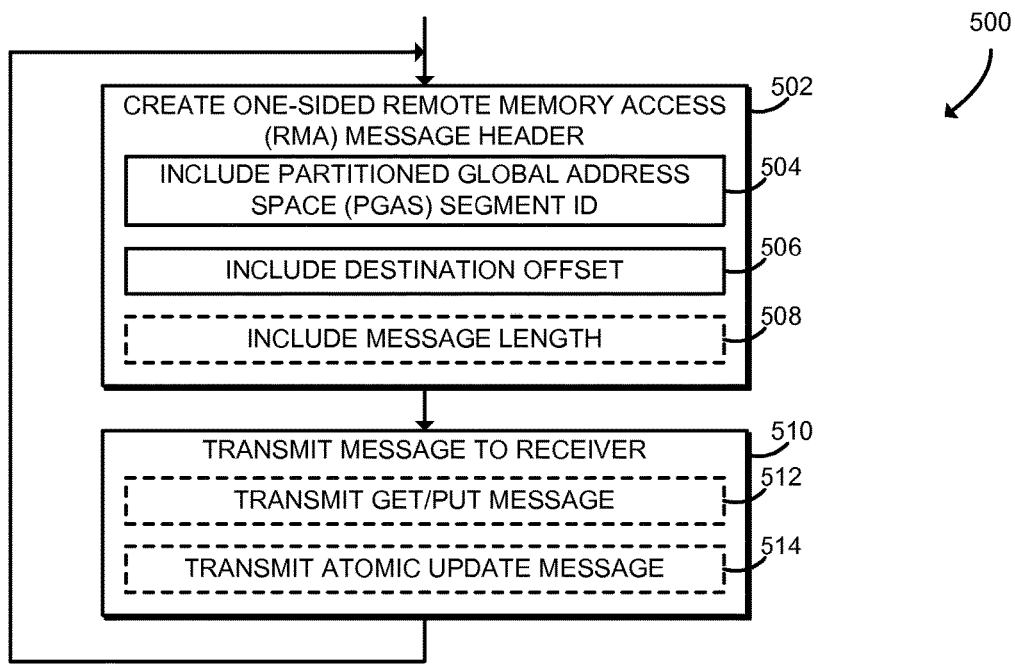
FIG. 5 is a simplified flow diagram of at least one embodiment of a method for remote access to a remotely accessible memory segment that may be executed by a sender computing node of the system of FIGS. 1 and 2.

Referring now to FIG. 5, in use, a computing node 102*a* may execute a method 500 for transmitting a remote memory access message 240 to a computing node 102*b*. The method 500 begins with block 502, in which the computing node 102*a* creates a one-sided remote memory access message 240. The message 240 includes a header or other information to identify a particular memory location in a remotely accessible partitioned global address space (PGAS) memory segment. In block 504, the computing node 102*a* includes a PGAS segment identifier in the message 240. The computing node 102*a* may encode the segment identifier in a header of the message 240, for example. In block 506, the computing node 102*a* includes a destination offset in the message 240. The destination offset identifies a particular location within the identified PGAS segment. For example, the destination offset may be added to a segment start address to determine a destination address within the memory 126 of the computing node 102*b*. As another example, the destination offset may be multiplied by a segment displacement unit (e.g., a data type size) and then added to the segment start address to determine the destination local address. In some embodiments, in block 508, the computing node 102*a* may include a message length in the message 240. As described above, the message length may be used to detect overflow, among other things. The computing node 102*a* may also include any other appropriate data in the message 240, such as a network address or rank of the computing node 102*b*.

In block 510, the computing node 102*a* transmits the message 240 to the receiver computing node 102*b*. In some embodiments, in block 512 the computing node 102*a* may transmit a get or put message 240. In some embodiments, in block 514, the computing node 102*a* may transmit an atomic update message 240. As described above, the computing node 102*a* may also transmit higher-level messages, such as collective messages, synchronization messages, or other messages. After transmitting the message 240, the method 500 loops back to block 502 to continue transmitting messages 240.

EXAMPLES

Illustrative examples of the technologies disclosed herein are provided below. An embodiment of the technologies may include any one or more, and any combination of, the examples described below.

Example 1 includes a computing device for one-sided access to a remotely accessible memory segment, the computing device comprising a communication module to receive a remote memory access message from a sender computing device, wherein the remote memory access message includes a segment identifier and an offset; a segmentation module to (i) determine a segment start address based on the segment identifier, wherein the segment start address is associated with a remotely accessible segment of a memory of the computing device, and (ii) determine a local destination address within the remotely accessible segment of the memory of the computing device as a function of the segment start address and the offset; and a memory access module to perform a remote memory access operation requested by the remote memory access message at the local destination address.

Example 2 includes the subject matter of Example 1, and further including a host fabric interface, wherein to receive the remote memory access message comprises to receive the remote memory access message by the host fabric interface; to determine the segment start address based on the segment identifier comprises to determine the segment start address based on the segment identifier by the host fabric interface; to determine the local destination address comprises to determine the local destination address by the host fabric interface; and to perform the remote memory access operation comprises to perform the remote memory access operation by the host fabric interface.

Example 3 includes the subject matter of any of Examples 1 and 2, and wherein to determine the segment start address comprises to index a segment table of the computing device with the segment identifier to retrieve the segment start address.

Example 4 includes the subject matter of any of Examples 1-3, and wherein to index the segment table comprises to index a segment table stored in a main memory of the computing device.

Example 5 includes the subject matter of any of Examples 1-4, and wherein to index the segment table comprises to index a segment table stored in a host fabric interface of the computing device.

Example 6 includes the subject matter of any of Examples 1-5, and wherein the segmentation module is further to extract, by a host fabric interface of the computing device, the segment identifier from the remote memory access message; and to index the segment table comprises to index the segment table by the host fabric interface.

Example 7 includes the subject matter of any of Examples 1-6, and wherein to determine the local destination address comprises to add the segment start address and the offset.

Example 8 includes the subject matter of any of Examples 1-7, and wherein to determine the local destination address comprises to add, by a host fabric interface of the computing device, the segment start address and the offset.

Example 9 includes the subject matter of any of Examples 1-8, and wherein to determine the local destination address comprises to determine a displacement unit based on the segment identifier, wherein the displacement unit is associated with the remotely accessible segment of the memory of the computing device; and multiply the offset by the displacement unit.

Example 10 includes the subject matter of any of Examples 1-9, and wherein to determine the local destination address comprises to determine the displacement unit by a host fabric interface of the computing device; and multiply, by the host fabric interface, the offset by the displacement unit.

Example 11 includes the subject matter of any of Examples 1-10, and wherein to perform the remote memory access operation comprises to perform the remote memory access operation by a host fabric interface of the computing device.

Example 12 includes the subject matter of any of Examples 1-11, and wherein to perform the remote memory access operation comprises to read data from the local destination address or to write data to the local destination address.

Example 13 includes the subject matter of any of Examples 1-12, and wherein the remote memory access message further includes a message length; and the segmentation module is further to (i) determine a segment size based on the segment identifier and (ii) detect an overflow condition based on the offset, the message length, and the segment size.

Example 14 includes the subject matter of any of Examples 1-13, and wherein to detect the overflow condition comprises to detect the overflow condition by a host fabric interface of the computing device.

Example 15 includes a computing device for one-sided access to a remotely accessible memory segment, the computing device comprising a memory command module to create a remote memory access message that includes a segment identifier and an offset, wherein the segment identifier identifies a remotely accessible segment of a memory of a receiver computing device; and a communication module to transmit the remote memory access message to the receiver computing device.

Example 16 includes the subject matter of Example 15, and wherein the remote memory access message further includes a message length.

Example 17 includes the subject matter of any of Examples 15 and 16, and wherein the remote memory access message comprises a get message or a put message.

Example 18 includes a method for one-sided access to a remotely accessible memory segment, the method comprising receiving, by a computing device, a remote memory access message from a sender computing device, wherein the remote memory access message includes a segment identifier and an offset; determining, by the computing device, a segment start address based on the segment identifier, wherein the segment start address is associated with a remotely accessible segment of a memory of the computing device; determining, by the computing device, a local destination address within the remotely accessible segment of the memory of the computing device as a function of the segment start address and the offset; and performing, by the computing device, a remote memory access operation requested by the remote memory access message at the local destination address.

Example 19 includes the subject matter of Example 18, and wherein receiving the remote memory access message comprises receiving the remote memory access message by a host fabric interface of the computing device; determining the segment start address based on the segment identifier comprises determining the segment start address based on the segment identifier by the host fabric interface; determining the local destination address comprises determining the local destination address by the host fabric interface; and performing the remote memory access operation comprises performing the remote memory access operation by the host fabric interface.

Example 20 includes the subject matter of any of Examples 18 and 19, and wherein determining the segment start address comprises indexing a segment table of the computing device with the segment identifier to retrieve the segment start address.

Example 21 includes the subject matter of any of Examples 18-20, and wherein indexing the segment table comprises indexing a segment table stored in a main memory of the computing device.

Example 22 includes the subject matter of any of Examples 18-21, and wherein indexing the segment table comprises indexing the segment table stored in a host fabric interface of the computing device.

Example 23 includes the subject matter of any of Examples 18-22, and further including extracting, by a host fabric interface of the computing device, the segment identifier from the remote memory access message; wherein indexing the segment table comprises indexing the segment table by the host fabric interface.

Example 24 includes the subject matter of any of Examples 18-23, and wherein determining the local destination address comprises adding the segment start address and the offset.

Example 25 includes the subject matter of any of Examples 18-24, and wherein determining the local destination address comprises adding, by a host fabric interface of the computing device, the segment start address and the offset.

Example 26 includes the subject matter of any of Examples 18-25, and further including determining, by the computing device, a displacement unit based on the segment identifier, wherein the displacement unit is associated with the remotely accessible segment of the memory of the computing device; wherein determining the local destination address comprises multiplying the offset by the displacement unit.

Example 27 includes the subject matter of any of Examples 18-26, and wherein determining the displacement unit comprises determining the displacement unit by a host fabric interface of the computing device; and determining the local destination address comprises multiplying, by the host fabric interface, the offset by the displacement unit.

Example 28 includes the subject matter of any of Examples 18-27, and wherein performing the remote memory access operation comprises performing the remote memory access operation by a host fabric interface of the computing device.

Example 29 includes the subject matter of any of Examples 18-28, and wherein performing the remote memory access operation comprises reading data from the local destination address or writing data to the local destination address.

Example 30 includes the subject matter of any of Examples 18-29, and wherein the remote memory access message further includes a message length, the method further comprising determining, by the computing device, a segment size based on the segment identifier; and detecting, by the computing device, an overflow condition based on the offset, the message length, and the segment size.

Example 31 includes the subject matter of any of Examples 18-30, and wherein detecting the overflow condition comprises detecting the overflow condition by a host fabric interface of the computing device.

Example 32 includes a method for one-sided access to a remotely accessible memory segment, the method comprising creating, by a computing device, a remote memory access message including a segment identifier and an offset, wherein the segment identifier identifies a remotely accessible segment of a memory of a receiver computing device; and transmitting, by the computing device, the remote memory access message to the receiver computing device.

Example 33 includes the subject matter of Example 32, and wherein the remote memory access message further includes a message length.

Example 34 includes the subject matter of any of Examples 32 and 33, and wherein the remote memory access message comprises a get message or a put message.

Example 35 includes a computing device comprising a processor; and a memory having stored therein a plurality of instructions that when executed by the processor cause the computing device to perform the method of any of Examples 18-34.

Example 36 includes one or more machine readable storage media comprising a plurality of instructions stored thereon that in response to being executed result in a computing device performing the method of any of Examples 18-34.

Example 37 includes a computing device comprising means for performing the method of any of Examples 18-34.

Example 38 includes a computing device for one-sided access to a remotely accessible memory segment, the computing device comprising means for receiving a remote memory access message from a sender computing device, wherein the remote memory access message includes a segment identifier and an offset; means for determining a segment start address based on the segment identifier, wherein the segment start address is associated with a remotely accessible segment of a memory of the computing device; means for determining a local destination address within the remotely accessible segment of the memory of the computing device as a function of the segment start address and the offset; and means for performing a remote memory access operation requested by the remote memory access message at the local destination address.

Example 39 includes the subject matter of Example 38, and wherein the means for receiving the remote memory access message comprises means for receiving the remote memory access message by a host fabric interface of the computing device; the means for determining the segment start address based on the segment identifier comprises means for determining the segment start address based on the segment identifier by the host fabric interface; the means for determining the local destination address comprises means for determining the local destination address by the host fabric interface; and the means for performing the remote memory access operation comprises means for performing the remote memory access operation by the host fabric interface.

Example 40 includes the subject matter of any of Examples 38 and 39, and wherein the means for determining the segment start address comprises means for indexing a segment table of the computing device with the segment identifier to retrieve the segment start address.

Example 41 includes the subject matter of any of Examples 38-40, and wherein the means for indexing the segment table comprises means for indexing a segment table stored in a main memory of the computing device.

Example 42 includes the subject matter of any of Examples 38-41, and wherein the means for indexing the segment table comprises means for indexing the segment table stored in a host fabric interface of the computing device.

Example 43 includes the subject matter of any of Examples 38-42, and further including means for extracting, by a host fabric interface of the computing device, the segment identifier from the remote memory access message; wherein the means for indexing the segment table comprises means for indexing the segment table by the host fabric interface.

Example 44 includes the subject matter of any of Examples 38-43, and wherein the means for determining the local destination address comprises means for adding the segment start address and the offset.

Example 45 includes the subject matter of any of Examples 38-44, and wherein the means for determining the local destination address comprises means for adding, by a host fabric interface of the computing device, the segment start address and the offset.

Example 46 includes the subject matter of any of Examples 38-45, and further including means for determining a displacement unit based on the segment identifier, wherein the displacement unit is associated with the remotely accessible segment of the memory of the computing device; wherein the means for determining the local destination address comprises means for multiplying the offset by the displacement unit.

Example 47 includes the subject matter of any of Examples 38-46, and wherein the means for determining the displacement unit comprises means for determining the displacement unit by a host fabric interface of the computing device; and the means for determining the local destination address comprises means for multiplying, by the host fabric interface, the offset by the displacement unit.

Example 48 includes the subject matter of any of Examples 38-47, and wherein the means for performing the remote memory access operation comprises means for performing the remote memory access operation by a host fabric interface of the computing device.

Example 49 includes the subject matter of any of Examples 38-48, and wherein the means for performing the remote memory access operation comprises means for reading data from the local destination address or writing data to the local destination address.

Example 50 includes the subject matter of any of Examples 38-49, and wherein the remote memory access message further includes a message length, the computing device further comprising means for determining a segment size based on the segment identifier; and means for detecting an overflow condition based on the offset, the message length, and the segment size.

Example 51 includes the subject matter of any of Examples 38-50, and wherein the means for detecting the overflow condition comprises means for detecting the overflow condition by a host fabric interface of the computing device.

Example 52 includes a computing device for one-sided access to a remotely accessible memory segment, the computing device comprising means for creating a remote memory access message including a segment identifier and an offset, wherein the segment identifier identifies a remotely accessible segment of a memory of a receiver computing device; and means for transmitting the remote memory access message to the receiver computing device.

Example 53 includes the subject matter of Example 52, and wherein the remote memory access message further includes a message length.

Example 54 includes the subject matter of any of Examples 52 and 53, and wherein the remote memory access message comprises a get message or a put message.

The invention claimed is:

1. A computing device for one-sided access to a remotely accessible memory segment, the computing device comprising:
a communication module to receive a remote memory access message from a sender computing device, wherein the remote memory access message includes a segment identifier, an offset, and a message length;
a segmentation module to (i) determine a segment start address based on the segment identifier, wherein the segment start address is associated with a remotely accessible segment of a memory of the computing device, (ii) determine a local destination address within the remotely accessible segment of the memory of the computing device as a function of the segment start address and the offset, (iii) determine a segment size based on the segment identifier, and (iv) detect an overflow condition based on the offset, the message length, and the segment size; and
a memory access module to perform a remote memory access operation requested by the remote memory access message at the local destination address.

2. The computing device of claim 1, further comprising a host fabric interface, wherein:
to receive the remote memory access message comprises to receive the remote memory access message by the host fabric interface;
to determine the segment start address based on the segment identifier comprises to determine the segment start address based on the segment identifier by the host fabric interface;
to determine the local destination address comprises to determine the local destination address by the host fabric interface; and
to perform the remote memory access operation comprises to perform the remote memory access operation by the host fabric interface.

3. The computing device of claim 1, wherein to determine the segment start address comprises to index a segment table of the computing device with the segment identifier to retrieve the segment start address.

4. The computing device of claim 3, wherein to index the segment table comprises to index a segment table stored in a main memory of the computing device.

5. The computing device of claim 3, wherein to index the segment table comprises to index a segment table stored in a host fabric interface of the computing device.

6. The computing device of claim 1, wherein to determine the local destination address comprises to:
determine a displacement unit based on the segment identifier, wherein the displacement unit is associated with the remotely accessible segment of the memory of the computing device; and
multiply the offset by the displacement unit.

7. The computing device of claim 1, wherein to perform the remote memory access operation comprises to perform the remote memory access operation by a host fabric interface of the computing device.

8. A method for one-sided access to a remotely accessible memory segment, the method comprising:
receiving, by a computing device, a remote memory access message from a sender computing device, wherein the remote memory access message includes a segment identifier, an offset, and a message length;
determining, by the computing device, a segment start address based on the segment identifier, wherein the segment start address is associated with a remotely accessible segment of a memory of the computing device;
determining, by the computing device, a local destination address within the remotely accessible segment of the memory of the computing device as a function of the segment start address and the offset;
determining, by the computing device, a segment size based on the segment identifier;
detecting, by the computing device, an overflow condition based on the offset, the message length, and the segment size; and
performing, by the computing device, a remote memory access operation requested by the remote memory access message at the local destination address.

9. The method of claim 8, wherein:
receiving the remote memory access message comprises receiving the remote memory access message by a host fabric interface of the computing device;

determining the segment start address based on the segment identifier comprises determining the segment start address based on the segment identifier by the host fabric interface;

determining the local destination address comprises determining the local destination address by the host fabric interface; and performing the remote memory access operation comprises performing the remote memory access operation by the host fabric interface.

10. The method of claim 8, wherein determining the segment start address comprises indexing a segment table of the computing device with the segment identifier to retrieve the segment start address.

11. The method of claim 10, wherein indexing the segment table comprises indexing the segment table stored in a host fabric interface of the computing device.

12. The method of claim 8, wherein performing the remote memory access operation comprises performing the remote memory access operation by a host fabric interface of the computing device.

13. One or more non-transitory, computer-readable storage media comprising a plurality of instructions that in response to being executed cause a computing device to:

receive a remote memory access message from a sender computing device, wherein the remote memory access message includes a segment identifier, an offset, and a message length;

determine a segment start address based on the segment identifier, wherein the segment start address is associated with a remotely accessible segment of a memory of the computing device;

determine a local destination address within the remotely accessible segment of the memory of the computing device as a function of the segment start address and the offset;

determine a segment size based on the segment identifier;

detect an overflow condition based on the offset, the message length, and the segment size; and perform a remote memory access operation requested by the remote memory access message at the local destination address.

14. The one or more non-transitory, computer-readable storage media of claim 13, wherein:

to receive the remote memory access message comprises to receive the remote memory access message by a host fabric interface of the computing device;

to determine the segment start address based on the segment identifier comprises to determine the segment start address based on the segment identifier by the host fabric interface;

to determine the local destination address comprises to determine the local destination address by the host fabric interface; and to perform the remote memory access operation comprises to perform the remote memory access operation by the host fabric interface.

15. The one or more non-transitory, computer-readable storage media of claim 13, wherein to determine the segment start address comprises to index a segment table of the computing device with the segment identifier to retrieve the segment start address.

16. The one or more non-transitory, computer-readable storage media of claim 15, wherein to index the segment table comprises to index the segment table stored in a host fabric interface of the computing device.

17. The one or more non-transitory, computer-readable storage media of claim 13, wherein to perform the remote memory access operation comprises to perform the remote memory access operation by a host fabric interface of the computing device.

* * * * *